United States Patent
Degner et al.

(10) Patent No.: US 10,749,391 B2
(45) Date of Patent: Aug. 18, 2020

(54) ELECTRIC MACHINE ROTOR

(71) Applicant: Ford Global Technologies, LLC, Dearborn, MI (US)

(72) Inventors: Michael W. Degner, Novi, MI (US); Feng Liang, Troy, MI (US); Lusu Guo, Canton, MI (US); Leyi Zhu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/450,881

(22) Filed: Mar. 6, 2017

(65) Prior Publication Data

US 2018/0254675 A1    Sep. 6, 2018

(51) Int. Cl.
*H02K 1/27* (2006.01)
*H02K 1/02* (2006.01)

(52) U.S. Cl.
CPC ............... *H02K 1/276* (2013.01); *H02K 1/02* (2013.01); *H02K 1/2766* (2013.01); *H02K 2201/00* (2013.01)

(58) Field of Classification Search
CPC ............................ H02K 1/276; H02K 2201/00
USPC ...................................................... 310/156.48
See application file for complete search history.

(56) References Cited

U.S. PATENT DOCUMENTS

| | | | |
|---|---|---|---|
| 6,717,314 B2 * | 4/2004 | Horst | D06F 37/304 310/156.01 |
| 6,891,298 B2 * | 5/2005 | Gary | H02K 1/276 310/156.53 |
| 6,946,766 B2 * | 9/2005 | Gary | H02K 1/276 310/156.37 |
| 7,233,090 B2 * | 6/2007 | Evans | H02K 1/02 310/156.49 |
| 8,102,091 B2 * | 1/2012 | Ionel | H02K 1/276 310/156.53 |
| 8,247,940 B2 * | 8/2012 | Hino | H02K 1/276 310/156.47 |
| 8,368,273 B2 * | 2/2013 | Hino | H02K 1/276 310/156.47 |
| 8,536,748 B2 | 9/2013 | Liang et al. | |
| 8,766,503 B2 | 7/2014 | Kagami et al. | |
| 9,024,499 B2 | 5/2015 | Nakada | |
| 2007/0252467 A1 * | 11/2007 | Hoemann | H02K 1/276 310/156.53 |
| 2012/0200186 A1 * | 8/2012 | Sano | H02K 1/2766 310/156.01 |

(Continued)

FOREIGN PATENT DOCUMENTS

| | | | |
|---|---|---|---|
| JP | 2004119775 A | * | 4/2004 |
| WO | 2015172916 A1 | | 11/2015 |
| WO | WO-2015172916 A1 | * | 11/2015 ........... H02K 1/2766 |

*Primary Examiner* — Alex W Mok
(74) *Attorney, Agent, or Firm* — David B. Kelley; Brooks Kushman P.C.

(57) ABSTRACT

A rotor includes a unitary, single material substrate defining a rotor lamination having pockets defining legs and configured to contain permanent magnets therein to establish a magnetic pole of the rotor. The rotor includes a first region having a predefined magnetic permeability. The rotor includes a second region defined between the legs and an outer periphery of the lamination. The second region has a magnetic permeability less than the first region to reduce torque ripple of a predetermined harmonic order.

15 Claims, 7 Drawing Sheets

(56) References Cited

U.S. PATENT DOCUMENTS

| | | | | |
|---|---|---|---|---|
| 2012/0200187 A1* | 8/2012 | Sano | ................ | H02K 1/2766 |
| | | | | 310/156.07 |
| 2012/0274160 A1* | 11/2012 | Hino | ................ | H02K 1/276 |
| | | | | 310/54 |
| 2013/0320798 A1* | 12/2013 | Islam | ................ | H02K 1/276 |
| | | | | 310/156.53 |
| 2014/0217849 A1* | 8/2014 | Soma | ................ | H02K 1/276 |
| | | | | 310/156.53 |
| 2014/0246938 A1* | 9/2014 | Lillington | ............ | H02K 1/2746 |
| | | | | 310/156.01 |
| 2015/0270752 A1* | 9/2015 | Tanaka | ................ | H02K 1/2766 |
| | | | | 310/156.56 |

* cited by examiner

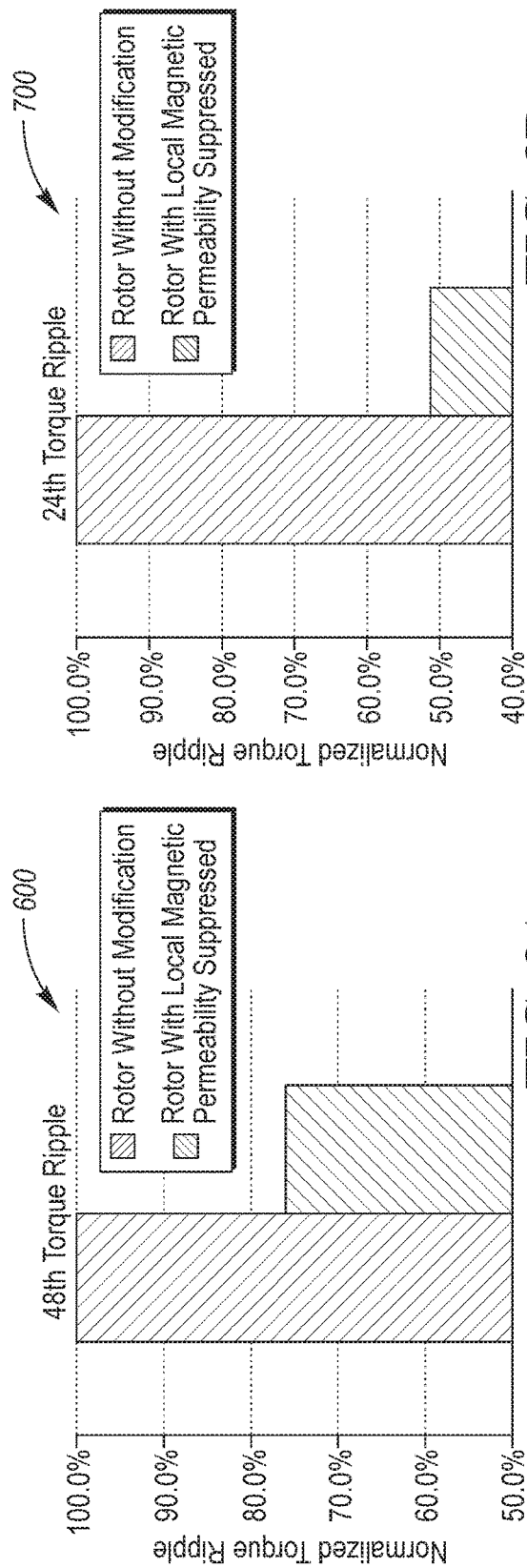
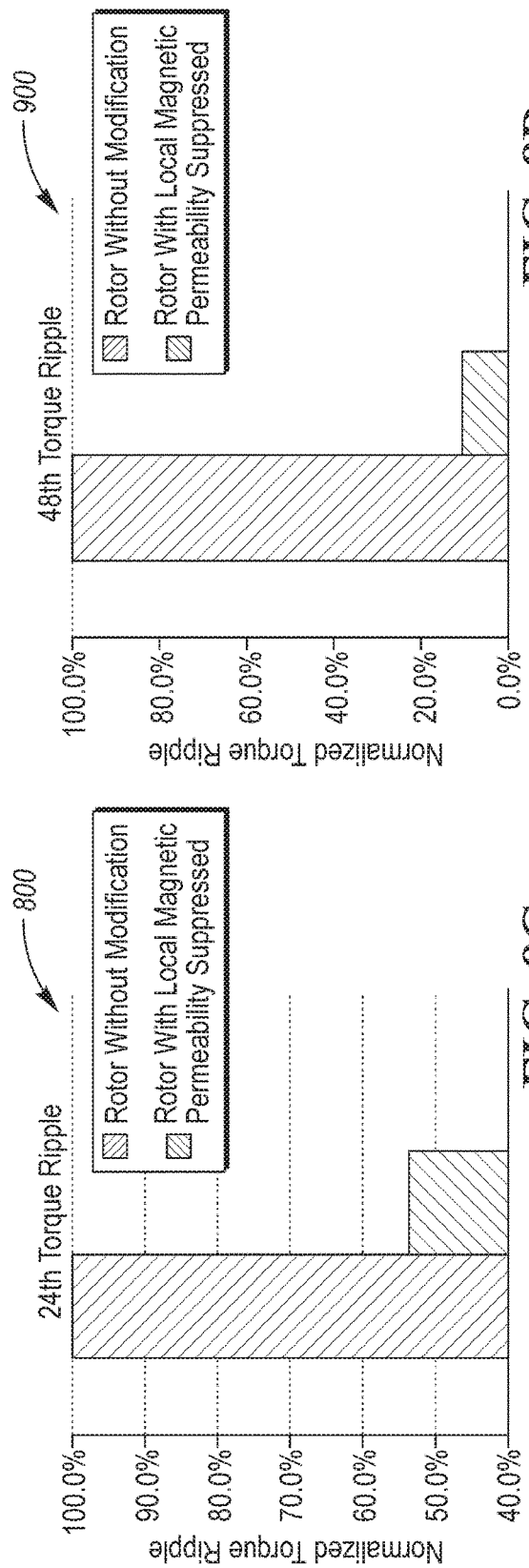

ELECTRIC MACHINE ROTOR

TECHNICAL FIELD

This disclosure relates to electric machine rotors.

BACKGROUND

Torque is generated by electric machines. Magnetic fields are generated in electric machines for the torque generation. The direction and magnitude of the magnetic fields impact the energy consumption and torque output of the electric machine. Field shaping regions are used to improve the direction and magnitude of the magnetic fields.

SUMMARY

A rotor includes a unitary, single material substrate defining a rotor lamination having pockets defining legs and configured to contain permanent magnets therein to establish a magnetic pole of the rotor. The rotor includes a first region having a predefined magnetic permeability. The rotor includes a second region defined between the legs and an outer periphery of the lamination. The second region has a magnetic permeability less than the first region to reduce torque ripple of a predetermined harmonic order.

A rotor includes a unitary, single material substrate defining a rotor lamination having a pair of adjacent pockets defining legs and configured to contain permanent magnets therein to establish magnetic poles of the rotor. The rotor includes a first region having a predefined magnetic permeability. The rotor includes a second region defined between adjacent legs of the pair and between an outer periphery of the lamination and a midline between the outer periphery and an axis of the rotor. The second region has a magnetic permeability less than the first region to reduce torque ripple of a predetermined harmonic order.

A rotor includes a unitary, single material substrate defining a rotor lamination having a pair of adjacent V-shaped pockets configured to contain permanent magnets therein to establish magnetic poles of the rotor. The rotor includes a first region having a predefined magnetic permeability. The rotor includes a second region having a magnetic permeability less than the first region, having a first section defined between adjacent legs of the pair and between an outer periphery of the lamination and a midline between the outer periphery and an axis of the rotor. The second region has a second section defined between legs of the pockets and the outer periphery.

BRIEF DESCRIPTION OF THE DRAWINGS

FIG. 8A is a graph showing the normalized $48^{th}$ order torque ripple of a rotor having a second region defined between legs of the V-shaped permanent magnet pockets that define a magnetic pole;

FIG. 8B is a graph showing the normalized $24^{th}$ order torque ripple of a rotor having a second region defined between pairs of magnetic poles;

FIG. 8C is a graph showing the normalised $24^{th}$ order torque ripple of a rotor having a second region having a first section defined between legs of the V-shaped permanent magnet pockets and pairs of V-shaped permanent, and a second section defined between adjacent legs the magnet pockets that define a magnetic pole and between pairs magnetic poles; and FIG. 8D is a graph showing the normalized $48^{th}$ order torque ripple of a rotor having a second region having a first section defined between legs of the V-shaped permanent magnet pockets and pairs of V-shaped permanent, and a second section defined between adjacent legs the magnet pockets that define a magnetic pole and between pairs magnetic poles.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are used to generate torque using a variety of methods. Some electric machines use permanent magnets to generate rotor magnetic fields. Other electric machines may use induced rotor magnetic fields or wound rotor electromagnets. Regardless, the direction and magnitude of the fields ensure proper torque generation. The magnetic fields may be shaped using a variety of methods. One method that can be used to shape magnetic fields is low magnetic permeability regions. The low magnetic permeability regions impede magnetic flux and redirect the flux to preferred directions. The rotor of the electric machine may be made of substantially one material or at least one substrate. Regions of the electric machine are transformed through plastic deformation, doping, or other methods to control the flow of the magnetic flux through the rotor lamination. The regions may be positioned to eliminate known and undesired fluxes or redirect those fluxes fruitfully.

During steady state operation, when electric machines are commanded to produce a constant torque, the actual torque produced is comprised of a constant quantity (the average torque) and a varying quantity (the torque ripple). Torque ripple is produced by the instantaneous interaction of undesirable components of the stator and rotor magnetic fluxes within an electric machine. Properly placed second regions in the rotor lamination may reduce the targeted harmonic fluxes, which in turn reduces ripples within the targeted orders.

Figures 1A, 1B:
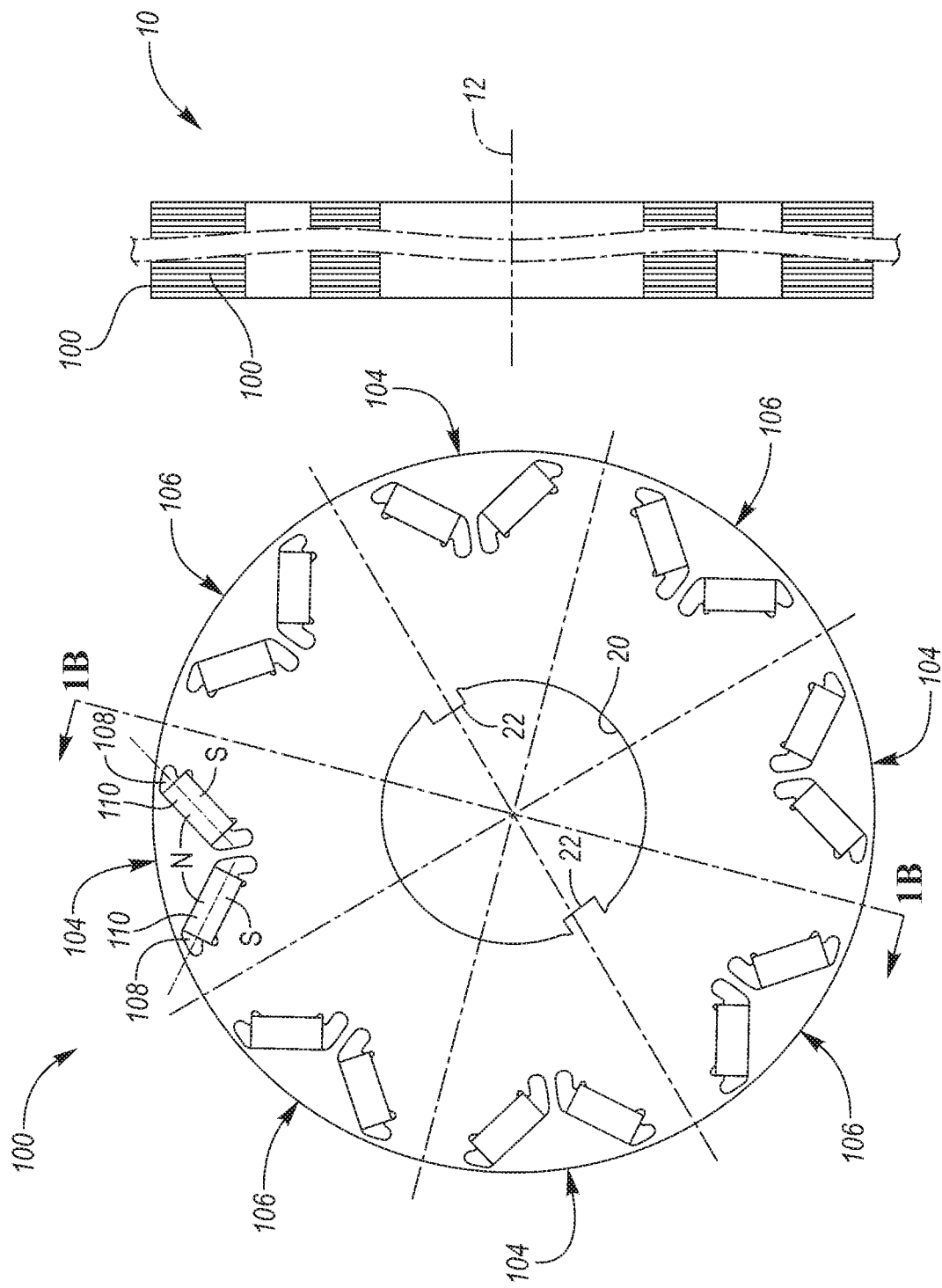
FIG. 1A is a plan view of a permanent magnet synchronous rotor lamination.
FIG. 1B is a side view of rotor laminations stacked to form a rotor or rotor section.

Referring to FIG. 1A-B, a rotor lamination 100 is shown. The rotor lamination 100 may be stacked with other laminations 100 to form a rotor 10. The laminations 100 may have the same or different layouts. The rotor may rotate about a central axis 12. The lamination 100 may have a pole pitch defining the magnetic poles 104, 106. For an eight-pole machine, the pole pitch is 45°. The poles 104, 106 may alternate between external north poles 104 and external south poles 106. The poles may be formed by permanent magnets 110 situated in pockets 108. The pockets may be arranged in V-shaped magnet pairs to define the magnetic poles 104, 106. The pockets 108 may include cavities to guide or direct magnetic fields emanating from the permanent magnets. The lamination 100 defines an inner hole 20 sized to receive a drive shaft. The inner hole 20 may include drive keys 22 to receive and lock the drive shaft in place.

Figure 2:
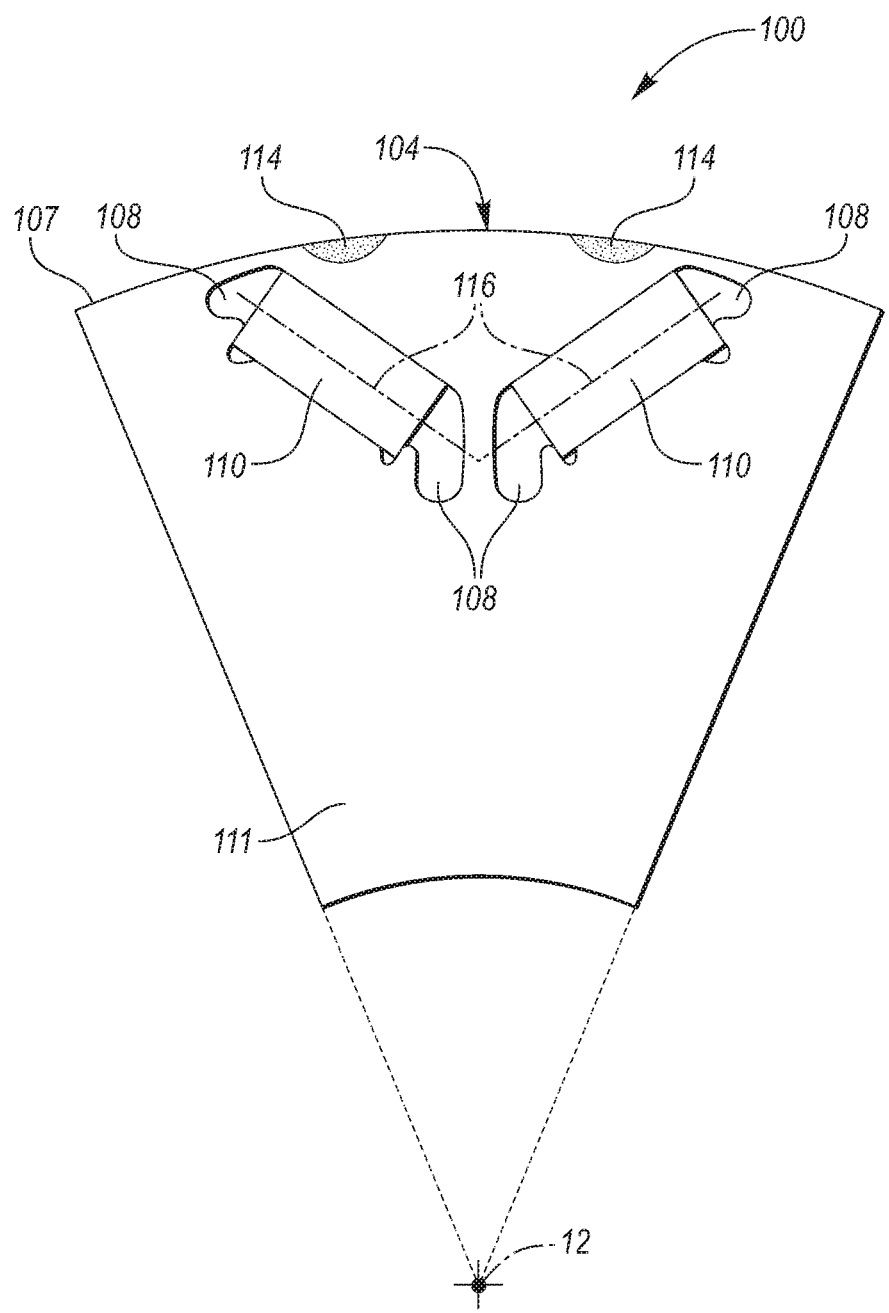
FIG. 2 is a rotor portion having a second region disposed between the magnet pockets that define a magnetic pole.

Referring to FIG. 2, a portion of a rotor lamination 100 is shown. The rotor lamination 100 includes a first region 111 defining pockets 108 for retaining permanent magnets 110, which generate a magnetic pole 104 of the rotor 10. The pockets 108 have a V-shape to form legs 116. The pockets 108 may have any shape. For example, the pockets may be V-shaped, U-shaped, or linearly shaped. The legs 116 may extend from a vertex of the V-shape, a respective common point on the U-shape (e.g., the bite), or comprise halves of the linear shape. The legs may be defined by an edge of the magnet 110, pockets 108, or a center line of the magnet 110. A second region 114 is defined between the legs 116 of the pockets 108 and an outer periphery 107 of the rotor. The second region 114 may have distinct sections, located near each of the legs as shown. Additional sections may be used to improve the $48^{th}$ harmonic response of the rotor. For example, the second region 114 may comprise any number of distinct sections as shown. The second region 114 improves the $48^{th}$ harmonic response of the rotor by reducing torque ripple when the second region is disposed or defined between the legs 116 of the V-shaped pockets. As shown, the second region 114 includes two distinct semi-ovoid sections disposed on or adjacent to the outer periphery 107. The second regions are formed through deformation or doping to maintain a substantially circular outer periphery 107 without divots, scallops, or gouges. The second region 114 allows the magnetic flux from the permanent magnets 110 to be directed without divots, scallops, or gouges.

The permeability of the first region 111 is equal to the permeability of the substrate material, preferably electrical steel with a permeability larger than $4\pi \times 10^{-7}$ H·m$^{-1}$. The second region 114 may have a permeability less than that of the first region 111. The reduced permeability of the second region 114 reduces the harmonic fluxes by changing the magnetic flux distribution on the surface of the magnetic poles 107 or airgap.

The magnetic permeability of the second region 114 may be modified or altered using deformation. Elastic or plastic deformation may be used. In plastic deformation, the substrate of the second region 114 may be deformed using a variety of methods. For example, indentations, peening, deformation, or punching may be used. Shot, laser, cavitation, and wet shot peening may be used. Deformation may cause the crystalline structure of the substrate to change, changing the magnetic permeability of the region deformed. The peening process may occur after the lamination is cast by making indentations in the second region 114. A die may be used to deform the lamination in the second region 114. Any type of deformation known in the art may be used to create the arcuate shape 112 of the second region 114.

The second region 114 magnetic permeability may be modified or altered by doping or modifying the composition of the substrate of the first region 111. For example, phase transformations may be used to alter the magnetic permeability of the substrate to define the second region 114. The lamination 100 may be heated and cooled in the second region 114 to change its magnetic permeability. Additives may be used to maintain altered magnetic permeability. Coating and diffusing may be used to cover the second region 114 and change the permeability of that region. The coating and diffusing may be an alloy including at least aluminum, silicon, carbon, sulfur, germanium, nickel, chromium, or any other combination of materials to change the permeability of the second region 114 without changing the substrate of the first region 111 and lamination 100. The coatings may be applied to some or all of the laminations 100 that are stacked to form the rotor 10. The elements above may be diffused into the substrate of the first region 111 to change its permeability and create the second region 114. For example, manganese, nickel, or a combination thereof may be diffused into the unitary, single substrate lamination 100 to alter the magnetic permeability of the second region 114. Additionally, ion implantation may be used to alter the second region 114, while maintaining a unitary, single substrate lamination 100.

Figure 3:
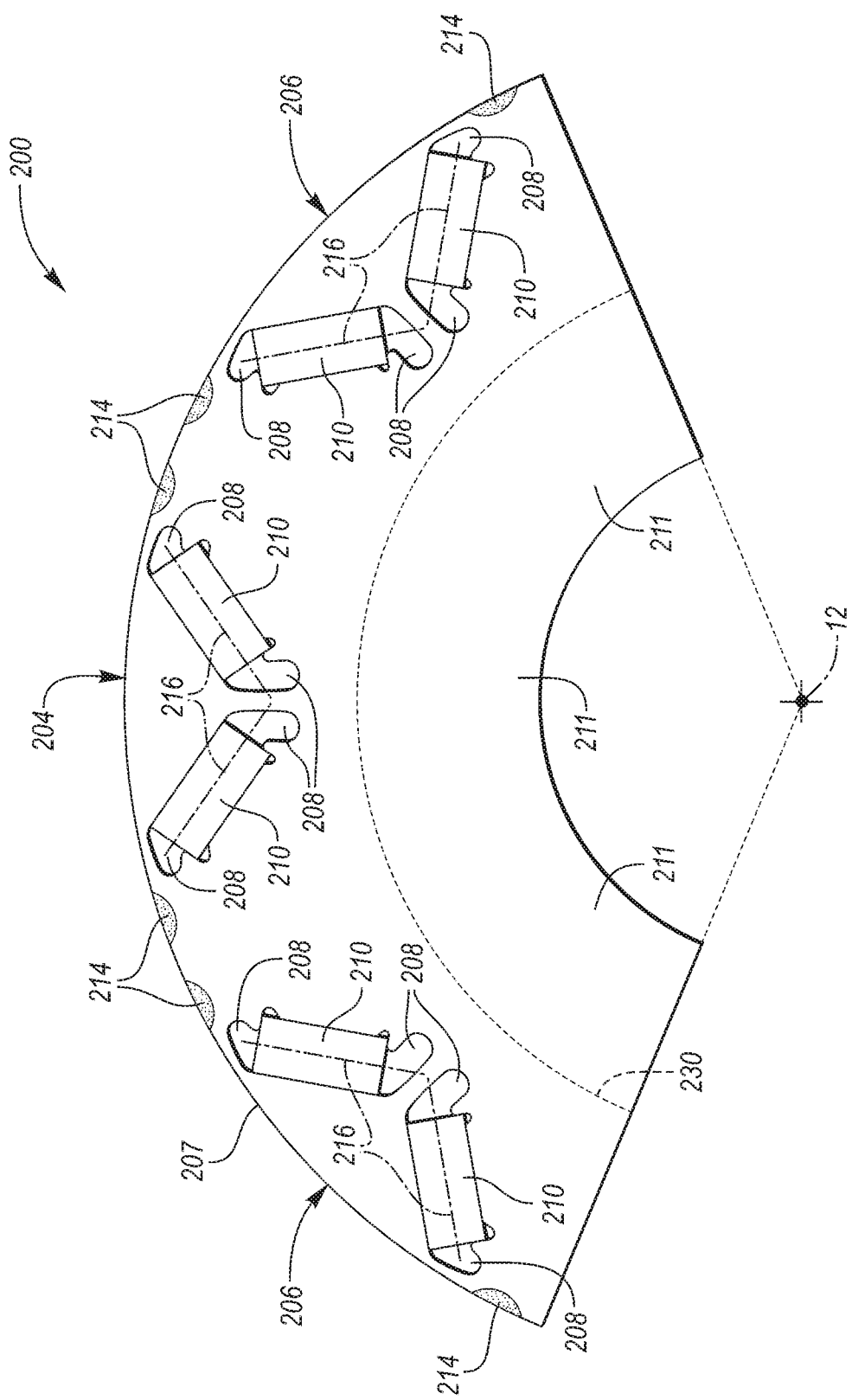
FIG. 3 is a rotor portion having pairs of permanent magnet pockets to form poles of the rotor and a second region disposed between the pole pairs.

Referring to FIG. 3, a portion of a rotor lamination 200 is shown. The rotor lamination 200 includes a first region 211 defining pockets 208 for retaining permanent magnets 210, which generate alternating magnetic poles 204, 206. The pockets 208 have a V-shape to form legs 216. A second region 214 is defined between the legs 216 of adjacent pairs of V-shaped pockets 208. Adjacent pairs may mean adjacent pole sections 104, 106 of the rotor. The second region 214 may have distinct sections, located near each of the legs 216, as shown. The sections may be between pairs of V-shaped magnet pockets 108. The sections may be above a midline 230 of the rotor lamination 200, which is between the central axis 12 and the outer periphery 207. Additional sections may be used to improve the $24^{th}$ harmonic response of the rotor. For example, the second region 214 may comprise any number of distinct sections. The second region 214 improves the $24^{th}$ harmonic response of the rotor by reducing torque ripple when the second region is disposed or defined between the legs 216 of the V-shaped pockets. As shown, the second region 214 includes two distinct semi-ovoid sections disposed on or adjacent to the outer periphery 207. The second regions are formed through deformation or doping, as described above, to maintain a substantially circular outer periphery 207 without divots, scallops, or gouges. The second region 214 allows the magnetic flux from the permanent magnets 210 to be directed without divots, scallops, or gouges.

Figure 4:
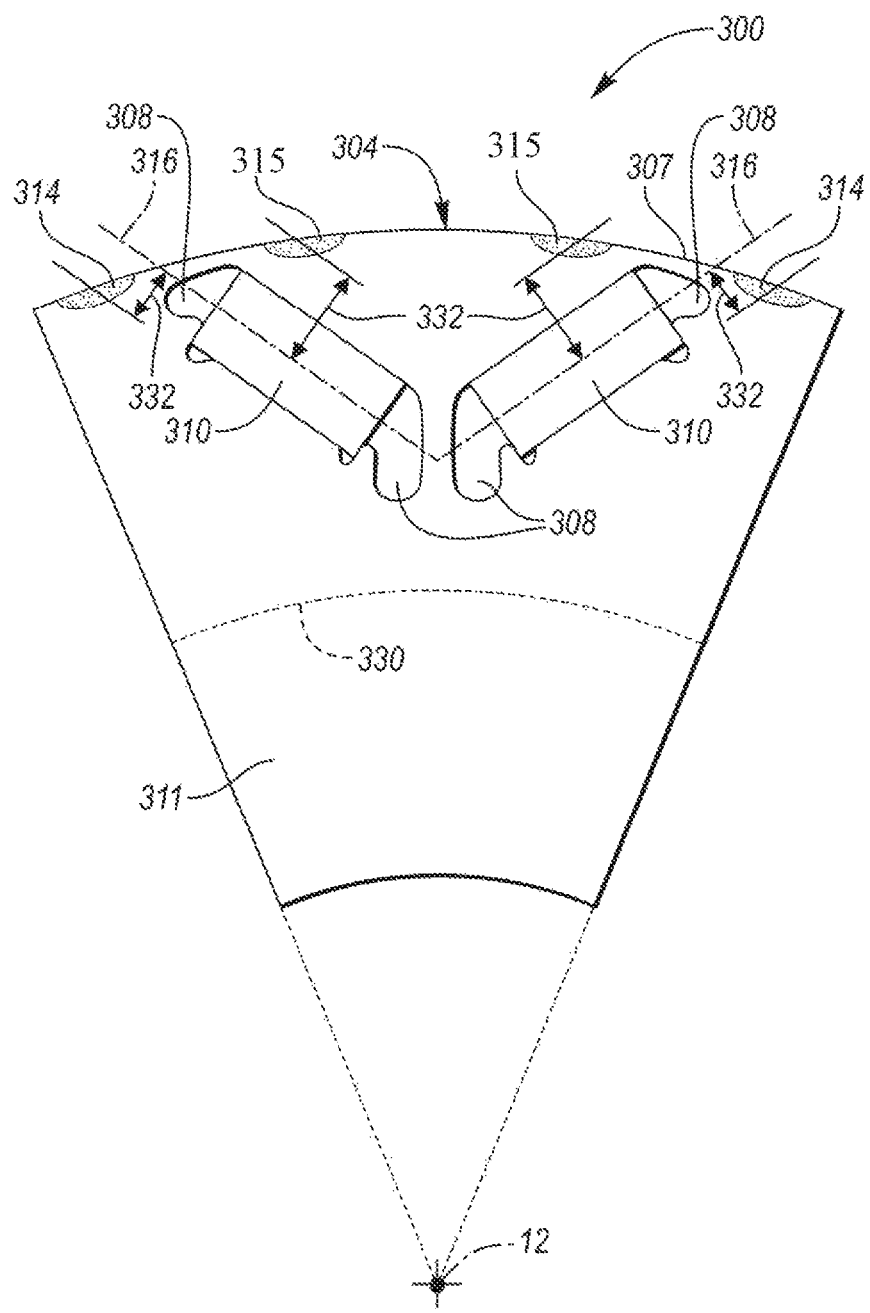
FIG. 4 is a rotor portion having a second region with distinct sections.

Referring to FIG. 4, a portion of a rotor lamination 300 is shown. The rotor lamination 300 includes a first region 311 defining pockets 308 for retaining permanent magnets 310, which generate magnetic pole 304. The pockets 308 have a V-shape to form legs 316. A second region 314 is defined between the legs 316 of the pockets 308. The second region 314 may have distinct sections, located near each of the legs 316, as shown. The sections may be between pairs of V-shaped magnet pockets 308. The sections may be above a midline 330 of the rotor lamination 300, which is between the central axis 12 and the outer periphery 307. Additional sections may be used to improve the $24^{th}$ harmonic response of the rotor. For example, the second region 314 may comprise any number of distinct sections. The second region 314 improves the $24^{th}$ harmonic response of the rotor by reducing torque ripple when the second region is disposed or defined between the legs 316 of adjacent V-shaped pockets. A third region 315 may also be disposed between legs 316 of one of the V-shaped magnet pockets 308 to improve harmonic responses related to the $48^{th}$ harmonic of the rotor. Therefore, as shown, the second and third region 314, 315 may include four distinct semi-ovoid sections disposed on or adjacent to the outer periphery 307, reducing the $24^{th}$ and $48^{th}$ harmonic responses of the rotor. The second and third regions 314, 315 are formed through deformation or doping, as described above, to maintain a substantially circular outer periphery 307 without divots, scallops, or gouges. The second and third regions 314, 315 allow the magnetic flux from the permanent magnets 310 to be directed without divots, scallops, or gouges.

Figure 5:
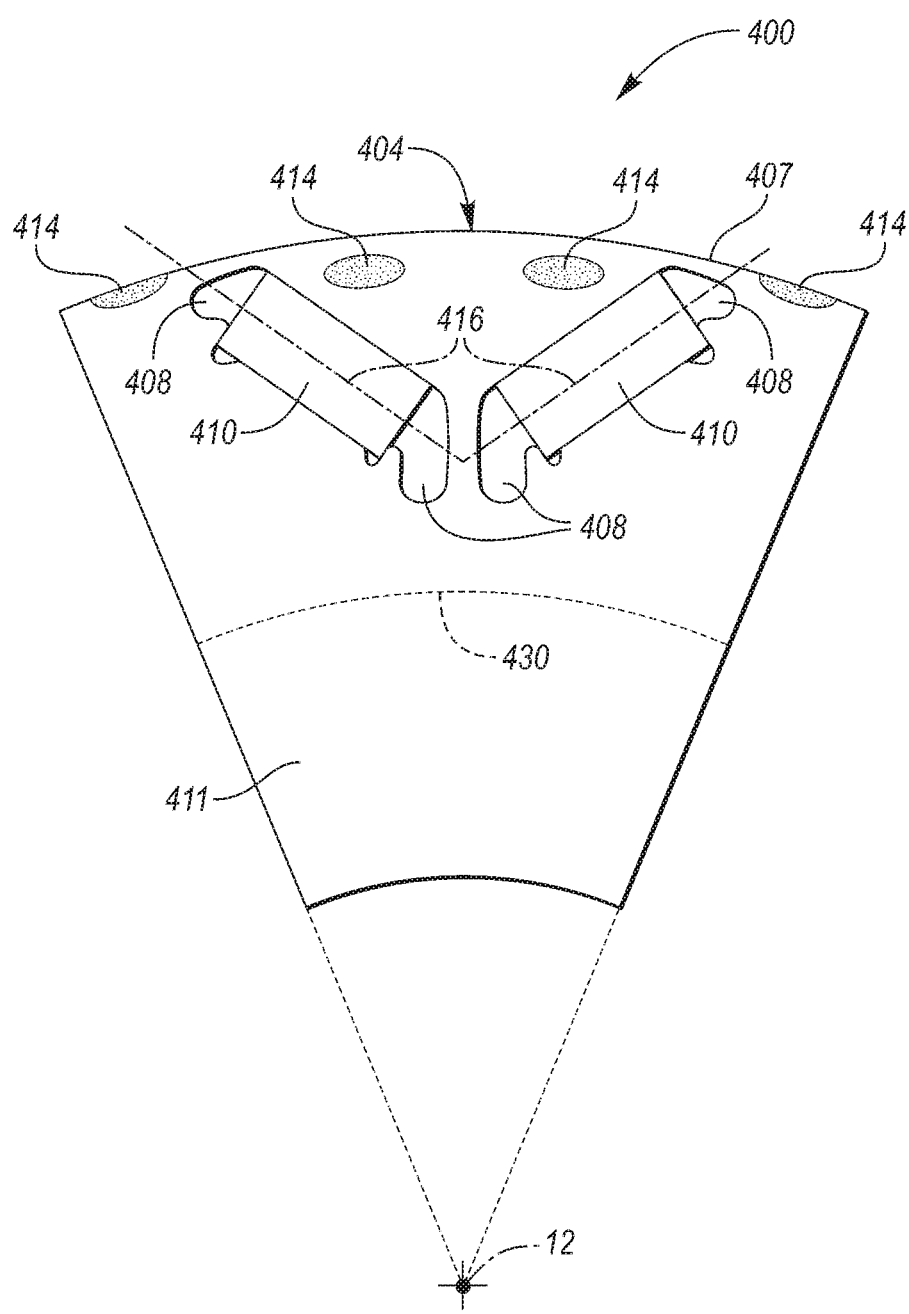
FIG. 5 is a rotor portion having a second region with distinct sections having knob shapes.

Referring to FIG. 5, a portion of a rotor lamination 400 is shown. The rotor lamination 400 includes a first region 411 defining pockets 408 for retaining permanent magnets 410, which generate alternating magnetic poles 404 of the rotor 10. The pockets 408 have a V-shape to form legs 416. A second region 414 is defined between the legs 416 of the pockets 408. The second region 414 may have distinct sections, located near each of the legs 416, as shown. The sections may be between pairs of V-shaped magnet pockets 408. The sections may be above a midline 430 of the rotor lamination 400, which is between the central axis 12 and the outer periphery 407. Additional sections may be used to improve the $24^{th}$ harmonic response of the rotor. For example, the second region 414 may comprise any number of distinct sections. The second region 414 improves the $24^{th}$ harmonic response of the rotor by reducing torque ripple when the second region is disposed or defined between the legs 416 of adjacent V-shaped pockets. The second region 414 may also be disposed between legs 416 of one of the V-shaped magnet pockets 408 to improve harmonic responses related to the $48^{th}$ harmonic of the rotor. Therefore, as shown, the second region 414 may include four distinct sections disposed on or adjacent to the outer periphery 407, reducing the $24^{th}$ and $48^{th}$ harmonic responses of the rotor. The sections, as shown, are knob-shaped. The knob-shape may also include a stem (not shown) with the handle. The second regions are formed through deformation or doping, as described above, to maintain a substantially circular outer periphery 407 without divots, scallops, or gouges. The second region 414 allows the magnetic flux from the permanent magnets 410 to be directed without divots, scallops, or gouges.

Figure 6:
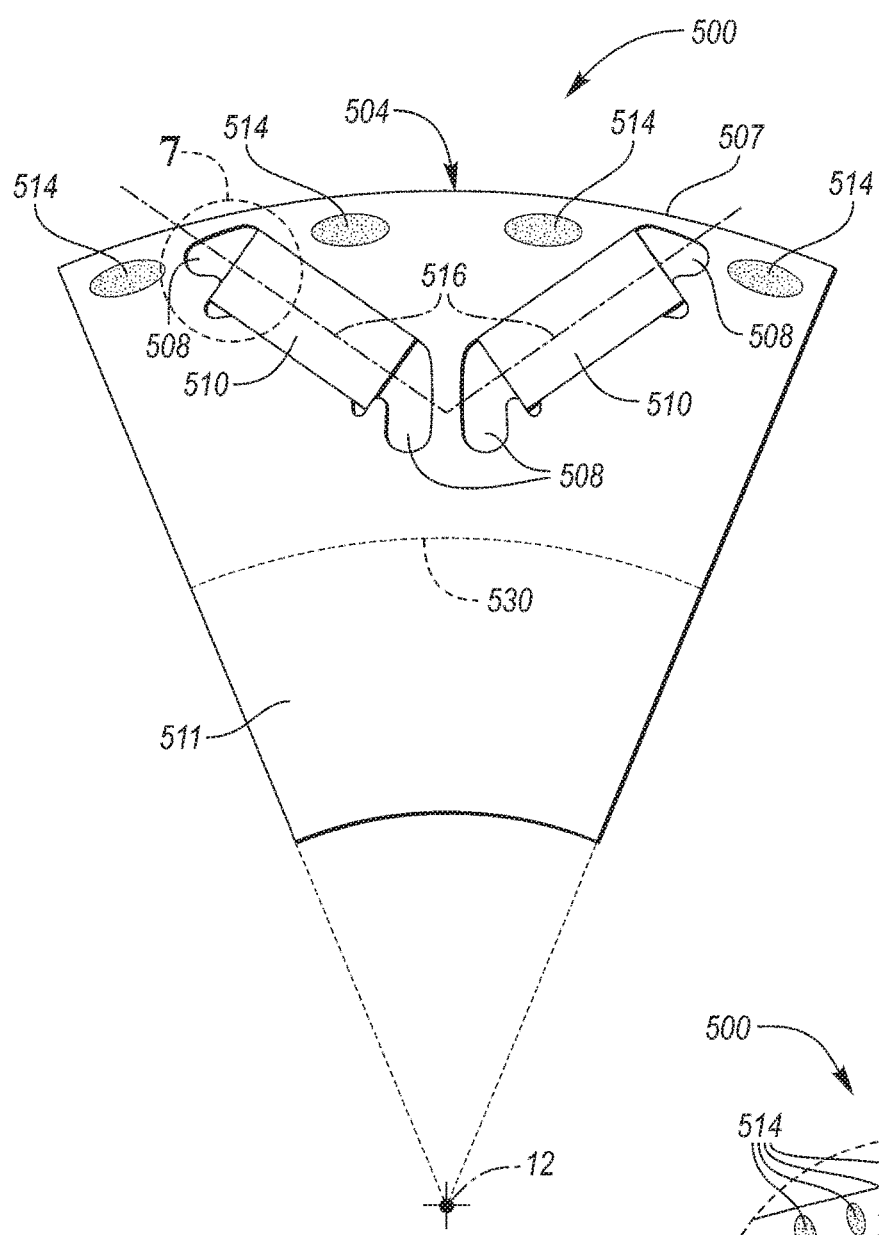
FIG. 6 is a rotor portion having a second region offset from the outer periphery of the rotor.

Referring to FIG. 6, a portion of a rotor lamination 500 is shown. The rotor lamination 500 includes a first region 511 defining pockets 508 for retaining permanent magnets 510, which generate alternating magnetic poles 504 of the rotor 10. The pockets 508 have a V-shape to form legs 516. A second region 514 is defined between the legs 516 of the pockets 508. The second region 514 may have distinct sections 514, first or second sections, located near each of the legs 516, as shown. The sections may be between pairs of V-shaped magnet pockets 108. The sections may be above a midline 530 of the rotor lamination 500, which is between the central axis 12 and the outer periphery 507. Additional sections may be used to improve the $24^{th}$ harmonic response of the rotor. The second region 514 improves the $24^{th}$ harmonic response of the rotor by reducing torque ripple when the second region is disposed or defined between the legs 516 of adjacent V-shaped pockets. The second region 514 may also be disposed between legs 516 of one of the V-shaped magnet pockets 508 to improve harmonic responses related to the $48^{th}$ harmonic of the rotor. Therefore, as shown, the second region 514 may include four distinct sections disposed on or adjacent to the outer periphery 507, reducing the $24^{th}$ and $48^{th}$ harmonic responses of the rotor. The sections, as shown, are an ovoid shape and offset from the outer periphery 507 of the lamination 500. Some or all of the sections of the region 514 may be offset. Some or all of the regions 514 may be ovoid, square, knob-like, rectangular, circular, or another geometric shape to change the magnetic flux of the lamination. As described above, the second regions are formed through deformation or doping to alter the magnetic flux from the permanent magnets 510.

Figure 7:
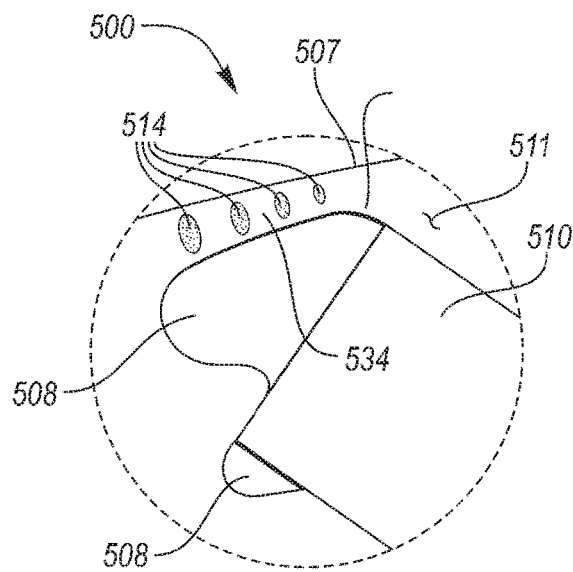
FIG. 7 is a rotor portion having a second region defined between a permanent magnet pocket and the outer periphery of the rotor.

Referring to FIG. 7, the rotor lamination 500 is shown. The lamination 500 may be combined with any of the other lamination designs described above. The lamination 500 includes a first region 511 that defines a permanent magnet pocket 508. The pocket 508 may be sized to house a permanent magnet 510. The rotor lamination 500 may include a second region 514 to direct magnetic flux. The second region 514 may have distinct sections uniformly or randomly distributed on a top bridge 534 of the lamination 500. The sections may be proportionally related to the thickness of the top bridge 534. The spacing between the sections may be based on the relative top bridge 534 thickness at the location of the section. The sections may be placed equidistant from the outer periphery 507 and the pocket 508.

Referring to FIG. 8A-D, graphs 600, 700, 800, 900 depict possible benefits of the lamination above designs. Graph 600 indicates a 25% reduction in torque ripple of an electric machine having a second region, as described above, between legs of a V-shaped magnet pockets. Graph 700 indicates a 50% reduction in torque ripple of an electric machine having a second region, as described above, between an adjacent pair of V-shaped magnet pockets. Graphs 800 and 900 indicate similar results when a rotor lamination includes a second region, as described above, between an adjacent pair of V-shaped magnet pockets and legs of a V-shaped magnet pocket.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rotor comprising:
 a unitary, single material substrate defining a rotor lamination having
   a plurality of V-shaped pockets configured to contain permanent magnets therein to establish magnetic poles of the rotor,
   a first region having a predefined magnetic permeability,
   a knob shaped second region defined between an adjacent pair of the V-shaped pockets, extending from an outer periphery of the rotor lamination toward an axis of the rotor lamination, having a magnetic permeability less than the first region, and configured to reduce $24^{th}$ harmonic order torque ripple resulting from rotation of the poles within a stator magnetic field at a predefined speed, and
   a knob shaped third region defined between legs of one of the V-shaped pockets, extending from the outer periphery of the rotor lamination toward the axis of the rotor lamination, having a magnetic permeability less than the first region, and configured to reduce $48^{th}$ harmonic order torque ripple resulting from rotation of the poles within a stator magnetic field at the predefined speed.

2. The rotor of claim 1, wherein the second region is plastically deformed to change its magnetic permeability.

3. The rotor of claim 1, wherein the second region is coated and diffused to change its magnetic permeability.

4. The rotor of claim 3, wherein the coating and diffusion includes manganese and nickel.

5. The rotor of claim 3, wherein the coating and diffusion includes at least one of aluminum, silicon, carbon, sulfur, germanium, nickel, or chromium.

6. The rotor of claim 1, wherein the second region is defined adjacent to the outer periphery.

7. The rotor of claim 1, wherein the second region is spaced from the outer periphery.

8. The rotor of claim 1, wherein the second region includes physically separate sections.

9. The rotor of claim 8, wherein the sections are equidistant from corresponding legs of the pocket.

10. A rotor comprising:
 a single material substrate defining a rotor lamination having
   a pair of immediately adjacent V-shaped pockets configured to contain permanent magnets therein to establish adjacent poles of the rotor,
   a first solid region having a predefined magnetic permeability,
   a knob shaped second solid region extending from an outer periphery of the rotor lamination toward an axis of the rotor lamination, disposed between the pair, having a magnetic permeability less than the first region and configured to reduce $24^{th}$ harmonic order torque ripple resulting from rotation of the poles within a stator magnetic field at a predefined speed, and
   a knob shaped third solid region defined between legs of one of the V-shaped pockets, extending from the outer periphery of the rotor lamination toward the axis of the rotor lamination, having a magnetic permeability less than the first region, and configured to reduce $48^{th}$ harmonic order torque ripple resulting from rotation of the poles within the stator magnetic field at the predefined speed.

11. The rotor of claim 10, wherein the second region is partially defined between a cavity associated with the pockets and an outer periphery of the rotor lamination.

12. The rotor of claim 10, wherein the second region is defined adjacent to an outer periphery of the rotor.

13. The rotor of claim 10, wherein the second region is spaced apart from the outer periphery.

14. The rotor of claim 10, wherein the second region includes physically separate sections.

15. The rotor of claim 14, wherein the sections are equidistant from corresponding legs of the pocket.

* * * * *